United States Patent
Fisher (10) Patent No.: US 11,084,346 B2
(45) Date of Patent: Aug. 10, 2021

(54) AMPHIBIOUS VEHICLE

(71) Applicant: CONSTANT CHASE, LLC, Heathsville, VA (US)

(72) Inventor: Samuel Fisher, Lottsburg, VA (US)

(73) Assignee: CONSTANT CHASE, LLC, Heathsville, VA (US)

(*) Notice: Subject to any disclaimer, the term of this patent is extended or adjusted under 35 U.S.C. 154(b) by 0 days.

(21) Appl. No.: 16/785,293

(22) Filed: Feb. 7, 2020

(65) Prior Publication Data
US 2020/0254838 A1    Aug. 13, 2020

Related U.S. Application Data

(60) Provisional application No. 62/804,354, filed on Feb. 12, 2019.

(51) Int. Cl.
*B60F 3/00*    (2006.01)

(52) U.S. Cl.
CPC .......... *B60F 3/0015* (2013.01); *B60F 3/0038* (2013.01); *B60F 2301/04* (2013.01)

(58) Field of Classification Search
CPC ........ B60F 3/0015; B60F 3/0038; B60F 3/00; B60F 2301/04
See application file for complete search history.

(56) References Cited

U.S. PATENT DOCUMENTS

| 8,454,399 B1* | 6/2013 | Zelechonok | B60F 3/0069 440/12.51 |
| 2005/0003715 A1 | 1/2005 | Hewitt | |
| 2005/0170710 A1 | 8/2005 | Darby | |

FOREIGN PATENT DOCUMENTS

WO    2007141515    12/2007

OTHER PUBLICATIONS 625-50—ACC, Track, Rubber 18"—Frontier 6X6, Argo Adventure / Liewer Enterprises Inc., available at https://www.argoadventure.com/625-50--ACC-TRACK-RUBBER-18--FRONTIER-6X6_p_9836.html#tab-8, accessed Jan. 23, 2020, 4 pages.
7 Incredibly Cool Amphibious Vehicles You Can Buy!, Awesome Stuff 365, available at https://awesomestuff365.com/amphibious-vehicles/, accessed Jan. 23, 2020, 20 pages.
International Search Report and Written Opinion for PCT Appl. No. PCT/US2020/017466, dated Apr. 29, 2020, 7 pages.

* cited by examiner

*Primary Examiner* — Stephen P Avila
(74) *Attorney, Agent, or Firm* — Patent Law Of Virginia, PLLC; Brian J. Teague (57) ABSTRACT

An amphibious vehicle comprises a buoyant hull, a boat motor affixed to the hull to propel the amphibious vehicle in water, two or more powered wheel assemblies affixed to the hull to propel the amphibious vehicle on land, and two or more selectively rotatable arms affixing each wheel assembly to the hull. One or more of the wheel assemblies are affixed to opposing sides of the hull. Two or more selectively rotatable arms affix each wheel assembly to the hull. The arms affixing each respective wheel assembly are selectively rotatable in unison to move the respective wheel assembly between a lowered position and a raised position.

9 Claims, 8 Drawing Sheets

AMPHIBIOUS VEHICLE

CROSS-REFERENCE TO RELATED APPLICATIONS

This application claims priority to U.S. Provisional Application Ser. No. 62/804,354, filed Feb. 12, 2019, the contents of which are incorporated herein by reference in its entirety.

FIELD OF THE INVENTION

This invention relates to amphibious vehicles.

BACKGROUND

An amphibious vehicle is a vehicle that is able to travel on land and on water. An amphibious vehicle may also be able to travel through water that is so shallow that conventional watercraft (boats, etc.) would likely strike bottom and become grounded.

BRIEF SUMMARY OF THE DISCLOSURE

In one embodiment of the invention, an amphibious vehicle comprises amphibious vehicle comprises a buoyant hull, a boat motor affixed to the hull to propel the amphibious vehicle in water, two or more powered wheel assemblies affixed to the hull to propel the amphibious vehicle on land, and two or more selectively rotatable arms affixing each wheel assembly to the hull. One or more of the wheel assemblies are affixed to opposing sides of the hull. Two or more selectively rotatable arms affix each wheel assembly to the hull. The arms affixing each respective wheel assembly are selectively rotatable in unison to move the respective wheel assembly between a lowered position and a raised position.

Each wheel assembly may comprise two or more powered wheels. Each wheel assembly may further comprise a continuous tread around the two or more wheels.

Each wheel assembly may be selectively positionable at each of one or more positions between the lowered position and the raised position.

A position of each wheel assembly may be automatically selected. The position of each wheel assembly may be automatically selected based on a depth of water in which the amphibious vehicle is operating.

Each wheel assembly may be selectively movable between the raised position and a retracted position in which each wheel assembly is closer to a centerline of the amphibious vehicle than when in the raised position. The arms affixing each respective wheel assembly may be selectively bendable in unison to move the respective wheel assembly from the raised position to the retracted position and selectively straightenable in unison to move the respective wheel assembly from the retracted position to the raised position. Each wheel assembly may be selectively positionable at each of one or more positions between the raised position and the retracted position.

The boat motor may comprise one or more inboard motors or one or more outboard motors.

The boat motor may comprise one or more propeller-driven motors or one or more jet-driven motors.

BRIEF DESCRIPTION OF THE SEVERAL VIEWS OF THE DRAWINGS

Reference will now be made to the accompanying drawings, which are not necessarily drawn to scale. The following detailed description of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Certain terminology is used in the following description for convenience only and is not limiting. The words "lower," "bottom," "upper," "top," "left" and "right" and the like designate directions in the drawings to which reference is made. The words "inwardly," "outwardly," "upwardly" and "downwardly" and the like refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention are directed to an amphibious vehicle as described herein, methods of constructing an amphibious vehicle as described herein, methods of controlling an amphibious vehicle as described herein, methods of operating an amphibious vehicle as described herein, and methods of travelling over land and water using an amphibious vehicle as described herein.

Amphibious vehicles of embodiments of the invention have a buoyant hull and a boat motor, like a conventional boat, for traveling in the water and also have two or more powered wheel or track assemblies (at least one, and typically two, on each side of the vehicle) for traveling on the land or in shallow water. Each such wheel or track assembly, described further below, may comprise one or more powered wheels, and may comprise a continuous tread surrounding one or more (typically three) powered wheels. If the vehicle has wheels only (i.e., no tracks), the powered rotation of the wheels propels the vehicle along the ground. If the vehicle has wheels and tracks, the powered rotation of the wheels rotates the track, and the rotation of the track in turn propels the vehicle along the ground. (While an amphibious vehicle of embodiments of the invention may have wheels only and not a track, the wheel assemblies and wheel/track assemblies will be referred to collectively herein as "wheel/track assemblies.") Some conventional all-terrain vehicles (ATVs) have similar wheel/track assemblies, but such wheel/track assemblies are fixed in position on conventional ATVs. The wheels and tracks used to construct amphibious vehicles of embodiments of the invention may be the same as used to construct conventional ATVs (exemplary ATV tracks are sold by Adair Argo Sales).

Advantageously, the novel wheel/track assemblies of amphibious vehicles of embodiments of the invention are able to be lowered when needed, raised when not needed, and retracted for transport and storage of the vehicle, as described in detail below.

Referring now to the figures, an amphibious vehicle 10 is illustrated in accordance with embodiments of the invention. The amphibious vehicle 10 comprises a buoyant hull 12. While hull 12 is similar to the hull of a conventional boat, the hull 12 of the amphibious vehicle 10 is stronger and sturdier than many conventional boat hulls to handle the mechanical stresses caused by the wheel/track assemblies (especially when the amphibious vehicle 10 is operating on land). The hull 12 would typically be constructed of aluminum or steel, although any suitable material or combination of materials may be used. A motor 14 provides propulsion when the amphibious vehicle 10 is operating on water. The illustrated motor 14 is an outboard motor affixed to the rear or stern of the vehicle, however any suitable type and size of motor and any suitable mounting position may be used (e.g., inboard or outboard; propeller or jet-drive). More than one motor may be used.

The amphibious vehicle 10 comprises a cockpit surrounded by raised gunwales 18, with a helm 34 and wheel 36, and a seat 38, although the specific cockpit and helm arrangement may vary from the illustrated embodiment. The amphibious vehicle 10 includes optional headlights 20. Other lights, such as navigational lights and search lights (not illustrated), may be included.

The amphibious vehicle 10 further comprises four wheel/track assemblies—two on each side—although a different number of wheel/track assemblies may be used (e.g., an amphibious vehicle of embodiments of the invention may have one wheel/track assembly on each side of the hull). Wheel/track assembly 16A is positioned on the front, left of the hull; wheel/track assembly 16B is positioned on the rear, left of the hull; wheel/track assembly 16C is positioned on the front, right of the hull; and wheel/track assembly 16D is positioned on the rear, right of the hull.

Each wheel/track assembly 16A-D may be raised or lowered and extended or retracted (as described below), separately and/or in unison in alternative embodiments of the invention. Each wheel/track assembly 16A-D is affixed to the hull 12 via two rotatable, hinged arms 22. Each arm 22 comprises a proximal portion 24, a distal portion 28, and a hinge 26 therebetween. Each proximal portion 24 is rotatably affixed to the hull 12 via a rotational axle 32, and each distal portion 28 is affixed to a respective wheel/track assembly 16A-D. A hydraulic linear actuator 30 (or other suitable mechanism) is affixed to each proximal and distal portions 24, 28 to enable each arm to be bent to retract the respective wheel/track assembly 16A-D and straightened to extend the respective wheel/track assembly 16A-D (as described further below). While it may be possible to have only one arm attached to each wheel/track assembly or to have more than two arms attached to each wheel/track assembly, having only two arms is preferred.

Any suitable mechanism may be used to affix the wheel/track assemblies to the corresponding arms. In the illustrated embodiment, for each pair of arms affixed to a respective one of the wheel/track assembly 16A-D, a wheel/track mounting bar 40 is affixed to the distal portions 28 of the arms 22. A plurality of rotatable hubs 42 (one for each of the three wheels in the illustrated embodiment) are affixed to the mounting bar 40. A wheel (not separately labeled) is mounted to each hub 42 and then the track (not separately labeled) is mounted around the wheels of each respective wheel/track assembly. One or more motors, hydraulic actuators, or any other suitable mechanism (collectively labeled 58 in FIG. 8) may be used to rotate the hubs, and in turn rotate the wheels (and therefore the corresponding track, if present) to propel the vehicle on land. The wheels (and therefore the corresponding track, if present) may be rotatable is either direction to enable forward and reverse propulsion on land.

As mentioned above, each of the arms 22 are rotatably affixed to the hull 12 via a rotational axle 32. Each pair of arms 22 that are affixed to a corresponding wheel/track assembly 16A-D are rotatable in unison to raise and lower the corresponding wheel/track assembly 16A-D. The arms may be rotated using any suitable mechanism, such as a hydraulic actuator or one or more motors (collectively labeled 54 in FIG. 8), which may be connected to the arms directly or via gearing, chain/sprocket, or the like. The rotation mechanism is typically housed within the hull to protect the mechanism from water, etc.

The arms may be rotatable in one direction only, or may be rotatable in either direction. The arms are rotatable between a first position in which the arms are straight down (this may be termed a "fully lowered" position, as the corresponding wheel/track assembly is fully lowered when the arms are in this position) and a second position in which the arms are straight up (this may be termed a "fully raised" position, as the corresponding wheel/track assembly is fully raised when the arms are in this position). The arms may be able to stop and hold a variety of different positions between the fully lowered and the fully raised positions, to enable a plurality of partially lowered positions. In one embodiment, the arms may be able to stop and hold at any position between fully lowered and fully raised (such that there are essentially infinite partially lowered positions). In an alternative embodiment, there are a predefined number of discreet partially lowered positions that may be selected. The arm and wheel/track assembly position may be selected by an operator, such as via a selector switch or knob, or other component of user interface 52. Alternatively or additionally, the arm and wheel/track assembly position may be selected automatically based on, e.g., water depth and vehicle position/heading/speed. For example, the amphibious vehicle may comprise a depth finder 60 such that the wheel/track assemblies are lowered when the amphibious vehicle is in water having a depth greater than a predefined threshold (e.g., four feet) and such that the wheel/track assemblies are raised when the amphibious vehicle is in water having a depth less than the predefined threshold. Any suitable algorithm may be used to automatically raise and lower the wheel/track assemblies.

Figure 1:
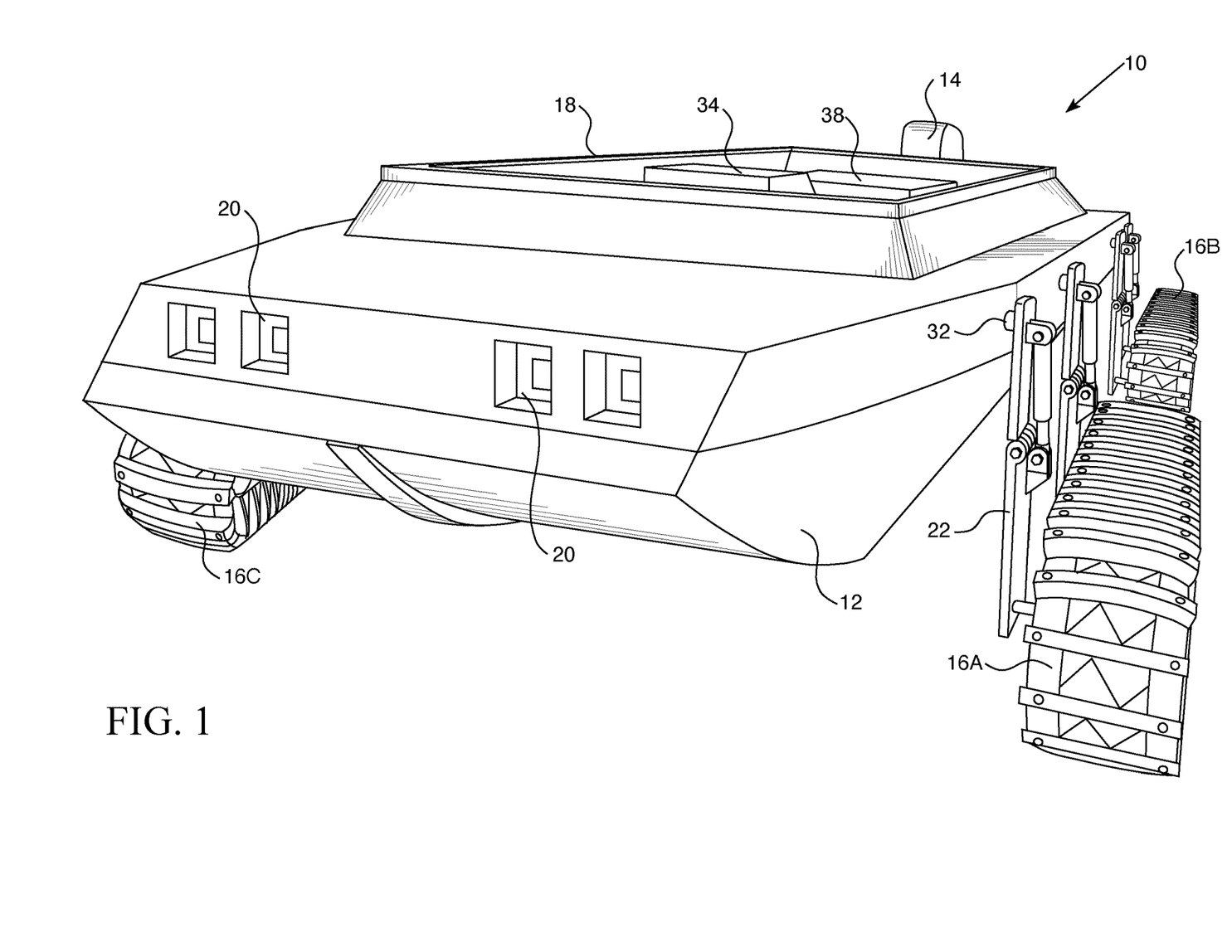
FIG. 1 is a perspective view from the front and left of an amphibious vehicle, in accordance with embodiments of the invention.
Figure 2:
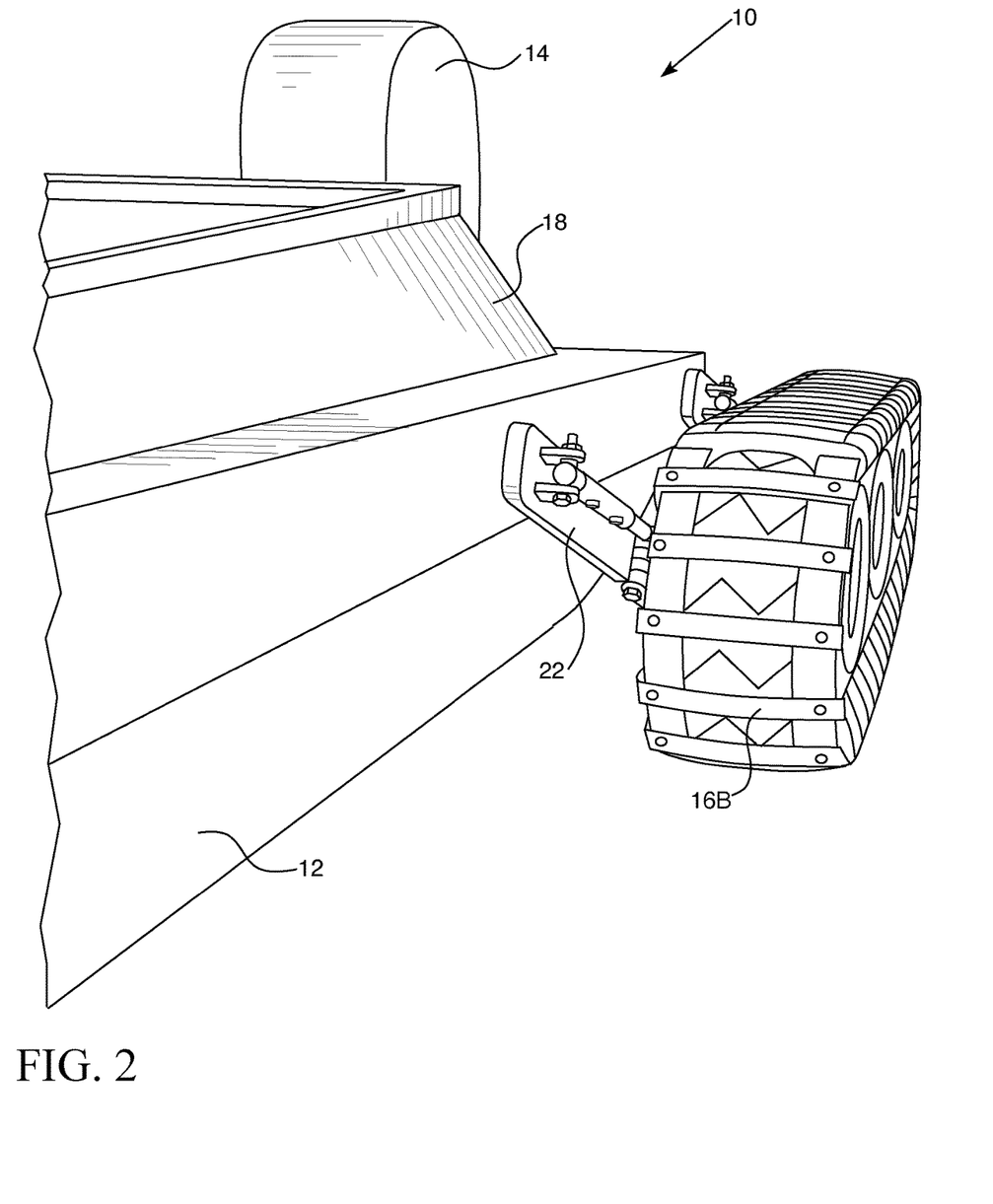
FIG. 2 is a close-up perspective view of the left rear section of the amphibious vehicle of FIG. 1.
Figure 3:
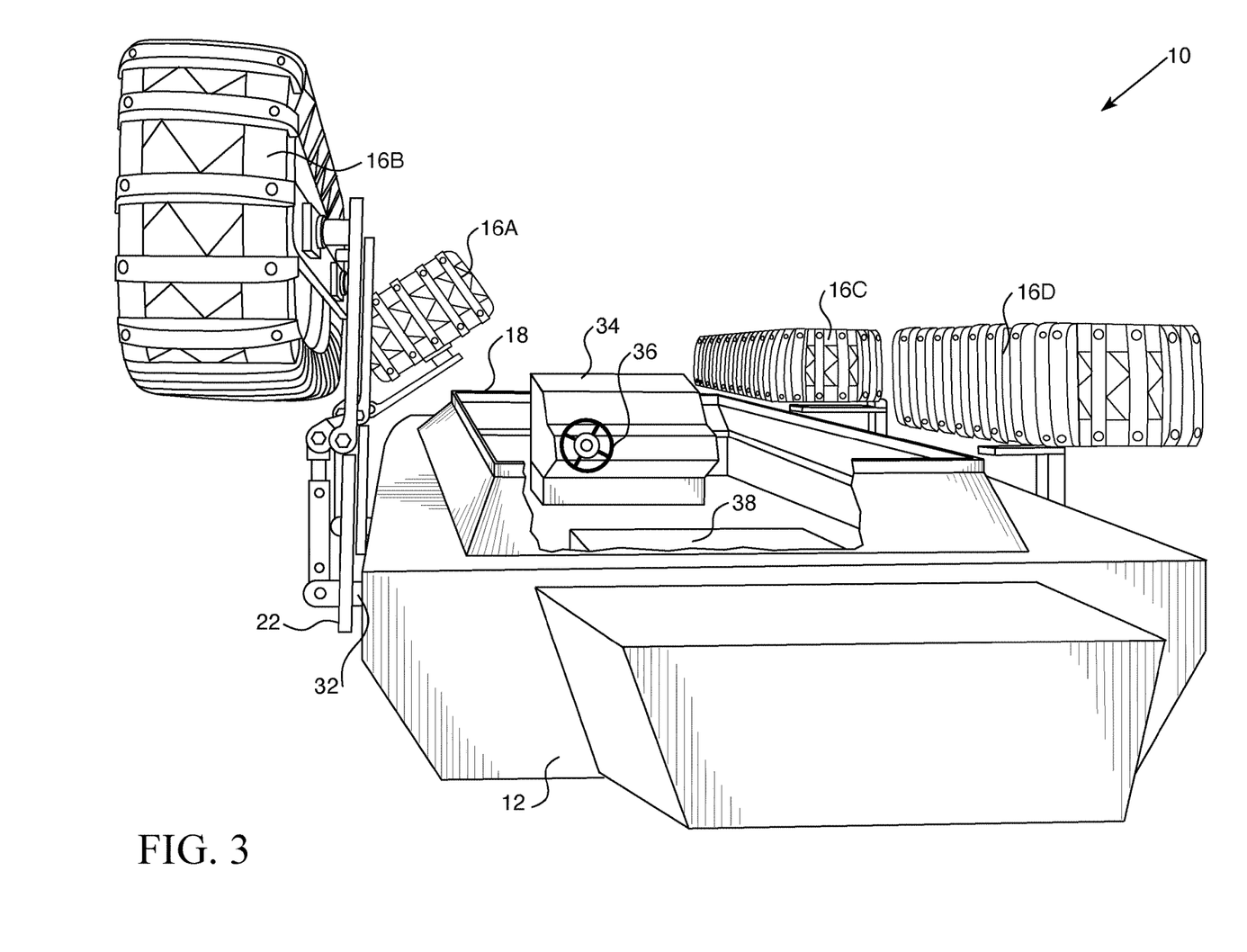
FIG. 3 is a perspective view from the rear and left of the amphibious vehicle of FIG. 1.
Figure 4:
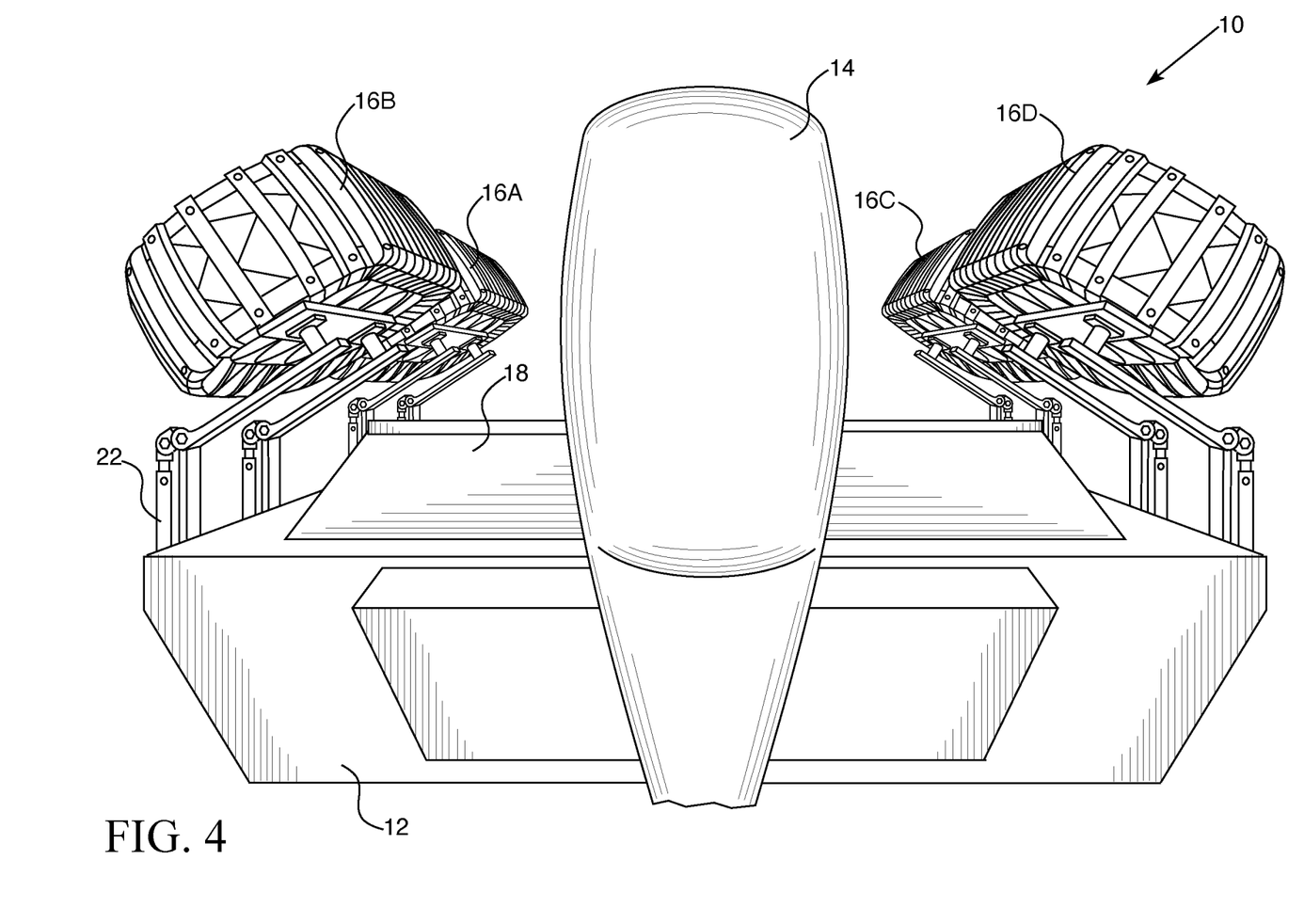
FIG. 4 is a rear view of the amphibious vehicle of FIG. 1.
Figure 5:
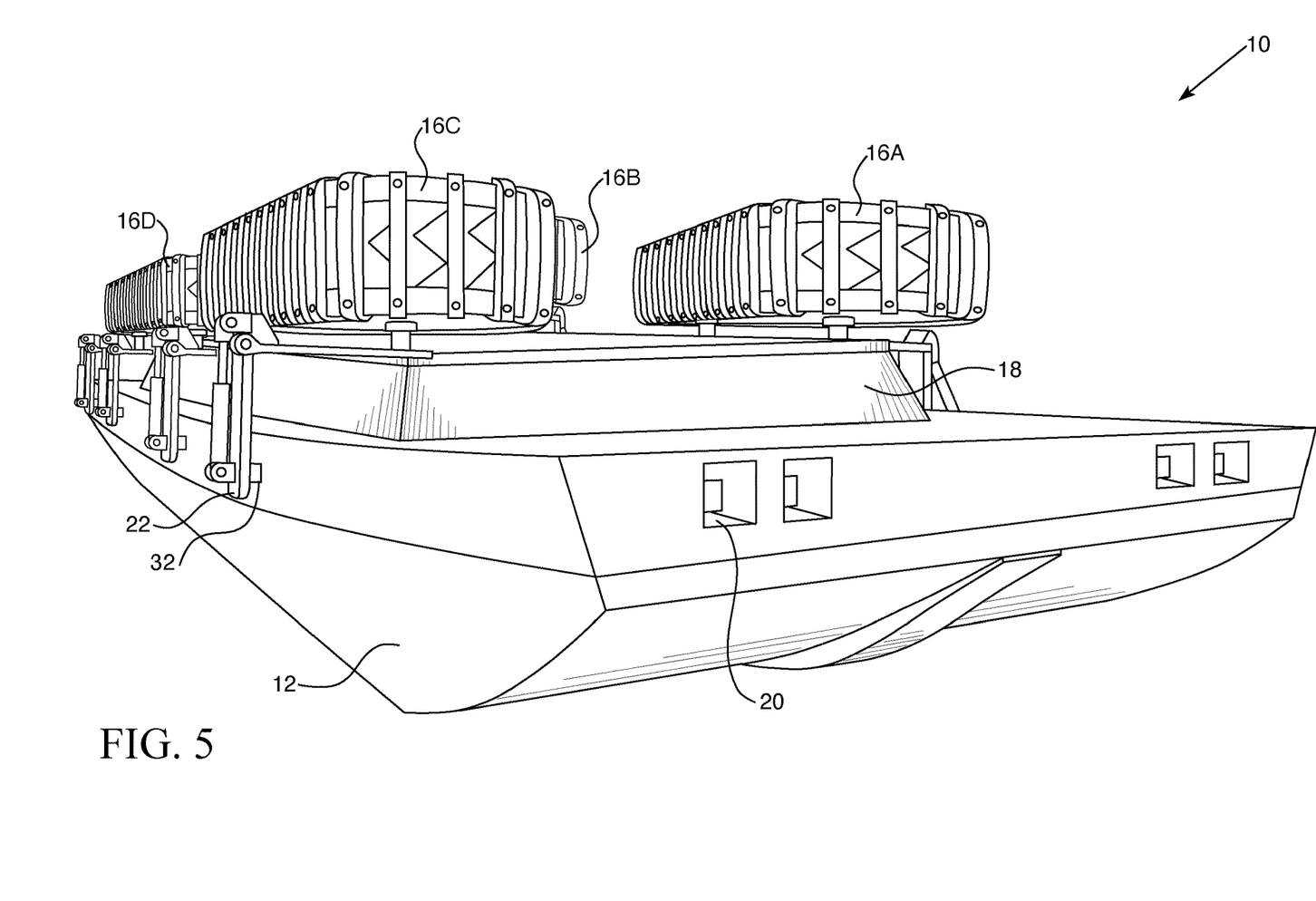
FIG. 5 is a perspective view from the front and right of the amphibious vehicle of FIG. 1.
Figure 6:
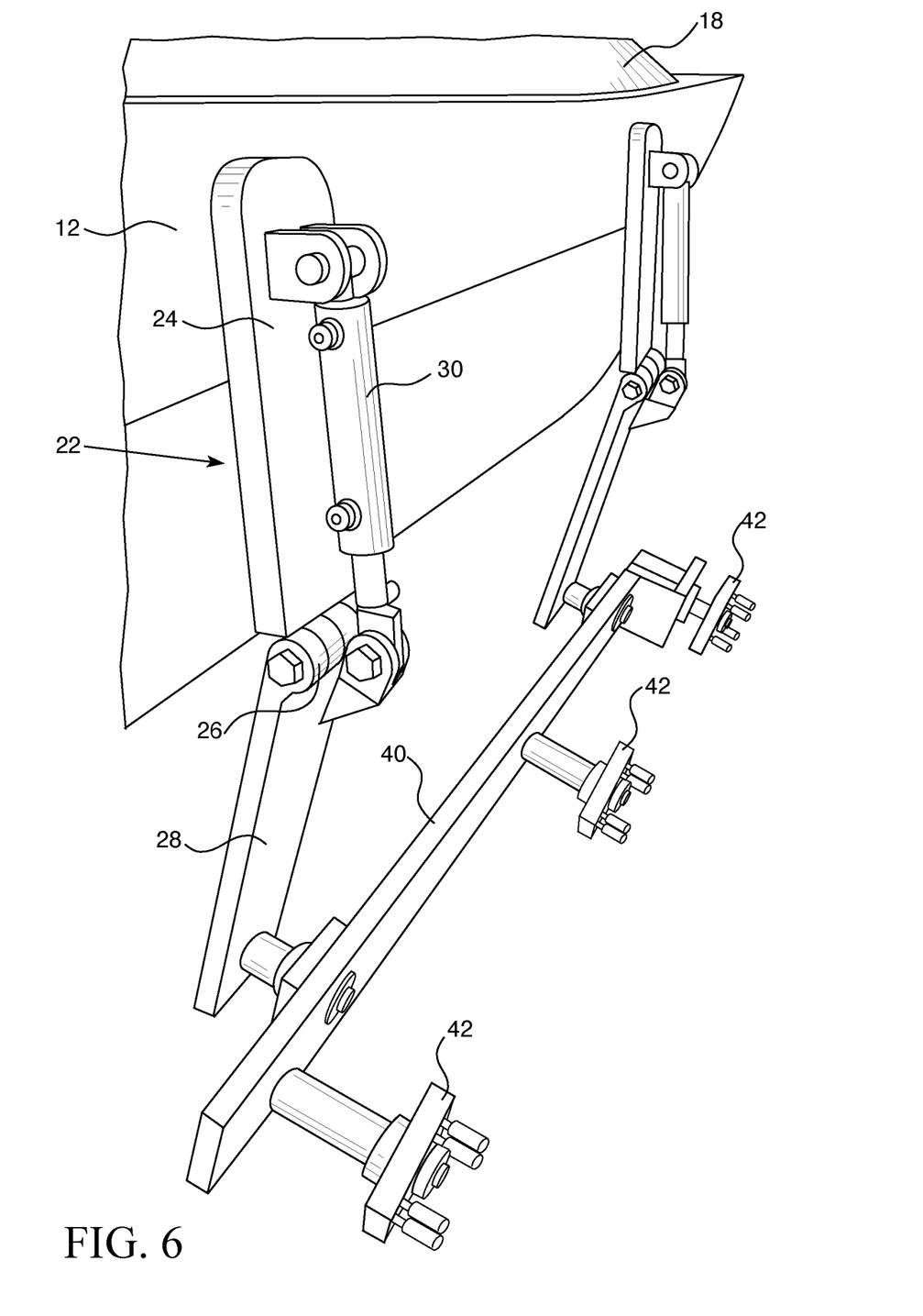
FIG. 6 is a perspective view of two of the track assembly positioning arms of the amphibious vehicle of FIG. 1, in a fully-extended position.
Figure 7:
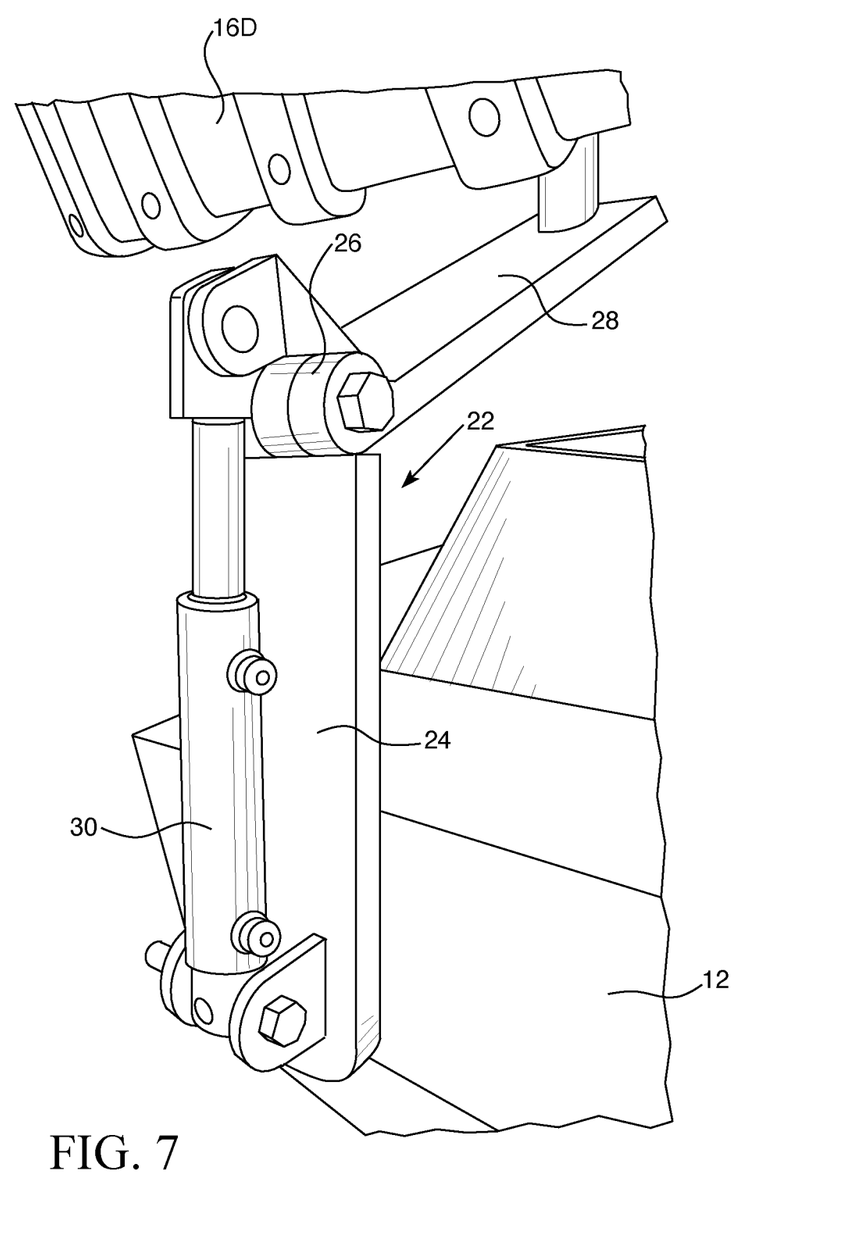
FIG. 7 is a close-up perspective view of one of the track assembly positioning arms of the amphibious vehicle of FIG. 1, in a partially-retracted position.

FIG. 1 shows the arms 22 in a fully lowered position. FIG. 2 shows the arms 22 in a partially lowered position. FIGS. 3-5 show the arms 22 in a fully raised position. Although not illustrated, each of the wheel/track assembly 16A-D may be raised and lowered separately (in at least some embodiments of the invention).

The arms (and therefore the wheel/track assemblies) may be placed in the fully lowered position when traveling on land. The arms (and therefore the wheel/track assemblies) may be placed in the fully raised position when traveling in deep water or when the vehicle is being transported or stored (the latter typically in conjunction with retracting the wheel/ track assemblies, as described below). The arms (and therefore the wheel/track assemblies) may be placed in a partially lowered position when traveling in shallow water in which there is a risk of running aground.

When a pair of arms has been rotated to the fully raised position, the hydraulic linear actuator 30 on each arm 22 can extend to bend the distal portion 28 of the arm 22 inward toward the centerline of the vehicle. This bending of the arms retracts the corresponding wheel/track assembly toward the centerline of the vehicle. Partially bending the arm (such that the angle between the proximal and distal portions is greater than 90 degrees and less than 180 degrees) partially retracts the corresponding wheel/track assembly (this is seen in FIG. 3 (wheel/track/assembly 16A only) and in FIG. 4). This may be termed a partially retracted position. Fully bending the arm (such that the angle between the proximal and distal portions is approximately 90 degrees) fully retracts the corresponding wheel/track assembly (this is seen in FIG. 3 (wheel/track/assemblies 16C, 16D only) and in FIG. 5). This may be termed a fully retracted position. The ability of the arms to bend in order to retract the wheel/track assemblies toward the centerline of the vehicle may be an optional feature of the amphibious vehicle of embodiments of the invention.

When a pair of arms is in the fully raised position but without the wheel/track assembly being retracted (such as with wheel/track assembly 16B in FIG. 3), the raised, unretracted wheel/track assembly protrudes significantly outward from the sides of the hull. This outward protrusion is typically acceptable during operations on the water (in fact, retraction of the wheel/track assembly may be undesirable during operation as the retracted wheel/track assembly may then intrude into interior of the hull where passengers may undesirably contact the retracted wheel/track assembly). However, this outward protrusion is typically unacceptable when the vehicle is being transported or stored. As such, the wheel/track assemblies are typically retracted (partially or fully) for transport and storage.

Figure 8:
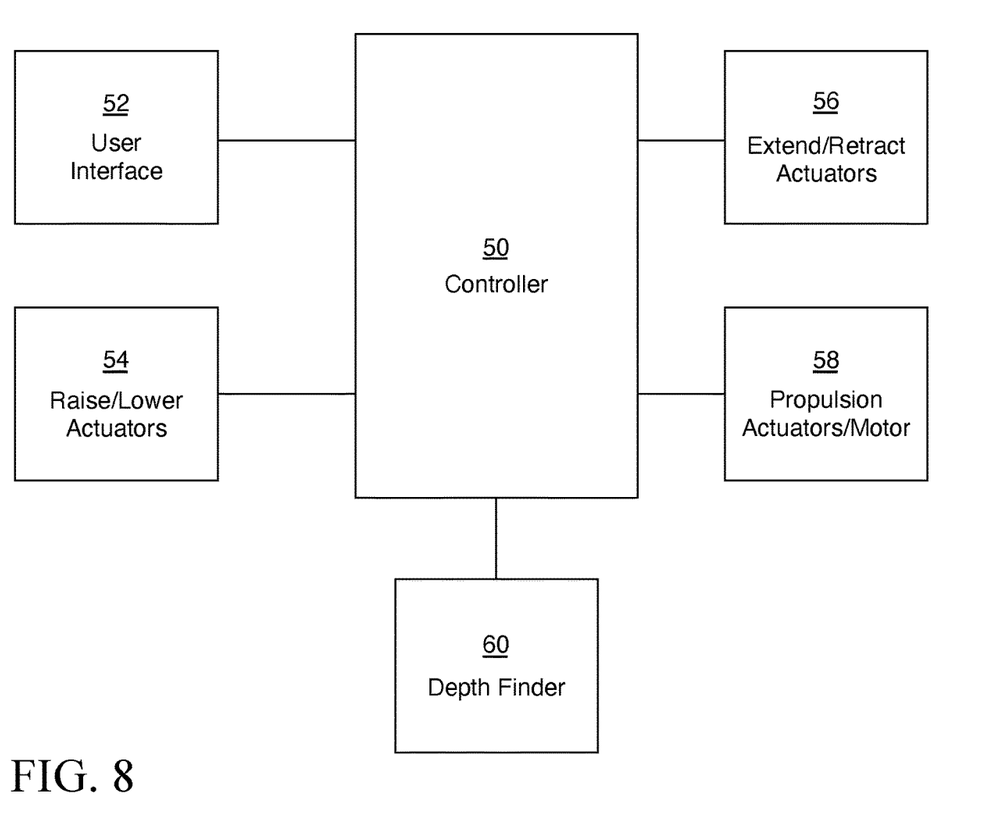
FIG. 8 is a functional block diagram of a control system of an amphibious vehicle, in accordance with embodiments of the invention.

FIG. 8 illustrates a simplified block diagram of a control system for an amphibious vehicle of embodiments of the present invention. The control system comprises a controller 50 for controlling the operation of the vehicle. The controller 50 may comprise a microprocessor, dedicated or general purpose circuitry (such as an application-specific integrated circuit or a field-programmable gate array), a suitably programmed computing device, or any other suitable means for controlling the operation of the vehicle. The controller 50 communicates with one or more user interface components 52, such as buttons, switches, knobs, or the like to receive inputs from an operator of the vehicle (such as to raise, lower, retract, or extend the wheel/track assemblies). The user interface components 52 may also comprise indicator lights, gauges, buzzers, etc. to provide information to the operator. The controller 50 controls the actuators 54 that raise and lower the wheel/track assemblies, the actuators 56 that retract and extend the wheel/track assemblies, and the actuators (or motors) that rotate the wheels to propel the vehicle on land. The controller 50 may receive water depth information from the depth finder 60.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. An amphibious vehicle comprising:
a buoyant hull;
a boat motor affixed to the hull to propel the amphibious vehicle in water;
two or more powered wheel assemblies affixed to the hull to propel the amphibious vehicle on land, one or more of the wheel assemblies each being affixed to opposing sides of the hull; and
two or more selectively rotatable arms affixing each wheel assembly to the hull, the arms affixing each respective wheel assembly being selectively rotatable in unison in a same plane to move the respective wheel assembly between a lowered position and a raised position;
wherein the arms affixing each respective wheel assembly are (1) selectively bendable in unison to move the respective wheel assembly from the raised position to a retracted position in which each wheel assembly is closer to a centerline of the amphibious vehicle than when in the raised position and (2) selectively straight-enable in unison to move the respective wheel assembly from the retracted position to the raised position.

2. The amphibious vehicle of claim 1, wherein each wheel assembly comprises two or more powered wheels.

3. The amphibious vehicle of claim 2, wherein each wheel assembly further comprises a continuous tread around the two or more wheels.

4. The amphibious vehicle of claim 1, wherein each wheel assembly is selectively positionable at each of one or more positions between the lowered position and the raised position.

5. The amphibious vehicle of claim 1, wherein a position of each wheel assembly is automatically selected.

6. The amphibious vehicle of claim 5, wherein the position of each wheel assembly is automatically selected based on a depth of water in which the amphibious vehicle is operating.

7. The amphibious vehicle of claim 1, wherein each wheel assembly is selectively positionable at each of one or more positions between the raised position and the retracted position.

8. The amphibious vehicle of claim 1, wherein the boat motor comprises one or more inboard motors or one or more outboard motors.

9. The amphibious vehicle of claim 1, wherein the boat motor comprises one or more propeller-driven motors or one or more jet-driven motors.

\* \* \* \* \*